United States Patent
Sun et al.

(10) Patent No.: US 8,588,080 B2
(45) Date of Patent: Nov. 19, 2013

(54) SYSTEM AND METHOD FOR USE OF RESERVED MEDIUM IN COEXISTING WIRELESS NETWORKS

(75) Inventors: Yanjun Sun, Richardson, TX (US); Ariton E. Xhafa, Plano, TX (US); Ramanuja Vedantham, Allen, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 345 days.

(21) Appl. No.: 13/047,122

(22) Filed: Mar. 14, 2011

(65) Prior Publication Data
US 2011/0222409 A1 Sep. 15, 2011

Related U.S. Application Data

(60) Provisional application No. 61/313,491, filed on Mar. 12, 2010.

(51) Int. Cl.
*H04L 12/26* (2006.01)
*H04W 4/00* (2009.01)
*H04M 1/00* (2006.01)

(52) U.S. Cl.
USPC .................. 370/241; 370/338; 455/553.1

(58) Field of Classification Search
USPC ................... 370/338, 241; 455/553.1
See application file for complete search history.

(56) References Cited

U.S. PATENT DOCUMENTS

| 7,177,294 B2* | 2/2007 | Chen et al. .......... 370/338 |
| 2010/0069112 A1* | 3/2010 | Sun et al. .......... 455/553.1 |
| 2011/0149939 A1* | 6/2011 | Wang et al. .......... 370/338 |

OTHER PUBLICATIONS

Alla Muqattash, Marwan Krunz, "POWMAC: A Single-Channel Power-Control Protocol for Throughput Enhancement in Wireless Ad Hoc Networks", May 2005, IEEE Journal on Selected Areas in Communications, vol. 23, No. 5, pp. 1067-1084.*

* cited by examiner

*Primary Examiner* — Andrew Lai
*Assistant Examiner* — Albert Shih
(74) *Attorney, Agent, or Firm* — Steven A. Shaw; W. James Brady; Frederick J. Telecky, Jr.

(57) ABSTRACT

A system and method for using reserved resources in coexisting wireless networks. In one embodiment, a wireless apparatus includes a receiver, a network activity monitor, and a network access scheduler. The receiver is configured to identify a received network reservation message that inhibits access to a first wireless network for an interval defined in the reservation message. The network activity monitor is configured to monitor wireless activity on the first wireless network during the interval. The network access scheduler is configured to determine whether the reservation message prevents conflict of the first wireless network with a coexisting wireless network during the interval, and to schedule, based on a determination that the reservation message prevents conflict with the coexisting wireless network, the wireless apparatus to transmit on the first wireless network during the interval to a wireless device other than a wireless device identified in the reservation message.

21 Claims, 3 Drawing Sheets

SYSTEM AND METHOD FOR USE OF RESERVED MEDIUM IN COEXISTING WIRELESS NETWORKS

CROSS-REFERENCE TO RELATED APPLICATION

The present application claims priority to U.S. Provisional Patent Application No. 61/313,491, filed on Mar. 12, 2010; which is hereby incorporated herein by reference in its entirety.

BACKGROUND

As wireless technologies proliferate, mobile wireless devices incorporate systems based on a multiplicity of different wireless standards. For example, a cellular telephone can accommodate a cellular network (e.g., Universal Mobile Telecommunications System), a wireless local area network ("WLAN"), such as a network based on the IEEE 802.11 standard, and a wireless personal area network ("WPAN") (e.g., a BLUETOOTH network).

Some of the various wireless standards adopted for use in mobile devices use adjacent and/or overlapping portions of the wireless spectrum. For example, both BLUETOOTH networks and IEEE 802.11b/g/n networks use the 2.45 gigahertz band.

SUMMARY

A system and method for using reserved resources in coexisting wireless networks are disclosed herein. In one embodiment, a wireless apparatus includes a receiver, a network activity monitor, and a network access scheduler. The receiver is configured to identify a received network reservation message that inhibits access to a first wireless network for an interval defined in the reservation message. The network activity monitor is configured to monitor wireless activity on the first wireless network during the interval. The network access scheduler is configured to determine whether the reservation message prevents conflict of the first wireless network with a coexisting wireless network during the interval. The network access scheduler is also configured to schedule, based on a determination that the reservation message prevents conflict of the first wireless network with the coexisting wireless network, the wireless apparatus to transmit on the first wireless network during the interval to a wireless device other than a wireless device identified in the reservation message.

In another embodiment, a method includes receiving, by a first wireless device, a network reservation message that reserves access to a resource of a first wireless network for an interval defined in the reservation message. Wireless activity on the first wireless network is monitored during the interval. Whether the reservation message prevents conflict of a coexisting wireless network with the first wireless network in a second wireless device is determined. A transmission to a third wireless device on the first wireless network is scheduled to occur during the interval.

In a further embodiment, a system includes a first wireless device and a second wireless device. The first wireless device includes a first transceiver, a second transceiver, and network resource reservation logic. The first transceiver is configured to access a first wireless network. The second transceiver is configured to access a coexisting wireless network. The network resource reservation logic is configured to transmit a first reservation message identifying the first wireless device via the first transceiver. The first reservation message inhibits access to the first wireless network for a time interval defined in the reservation message. The second wireless device includes a third network transceiver and a scheduler. The third network transceiver is configured to access the first wireless network. The scheduler is configured to determine whether a received reservation message identifying the first wireless device corresponds to the first reservation message. The scheduler is also configured to schedule, based on a determination that the received reservation message corresponds to the first reservation message, the third network transceiver to communicate with wireless devices other than the first wireless device via the first wireless network during the time interval.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
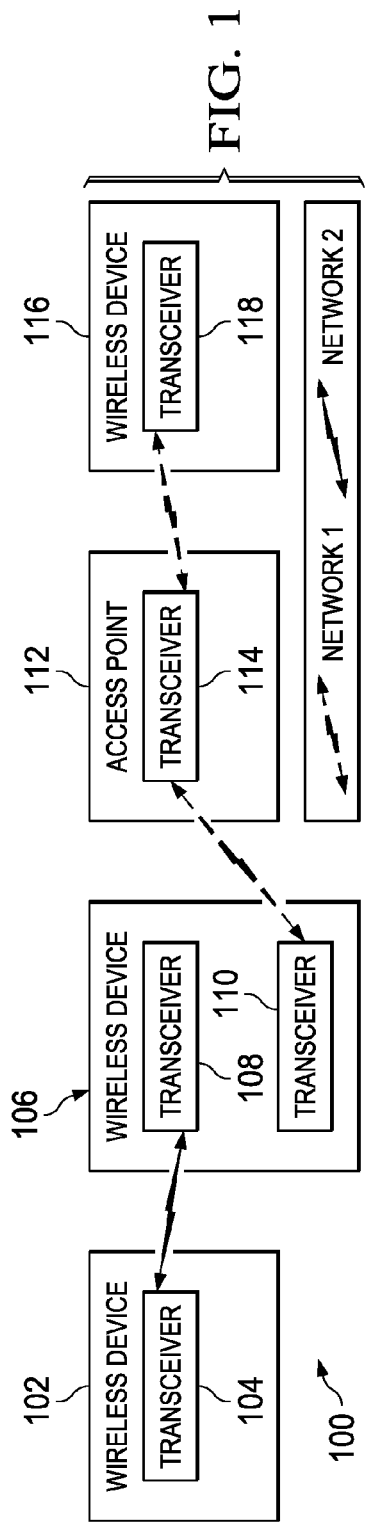
FIG. 1 shows a block diagram of a wireless system including wireless devices configured to use resources reserved for a coexisting wireless network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Next generation mobile devices implement a plurality of wireless technologies to access different networks such as WiMAX® networks, wireless local area networks ("WLAN") (e.g., IEEE 802.11b/g/n networks), LTE® networks, wireless universal serial bus, BLUETOOTH networks, etc. Such devices are referred to herein as "combo" devices. While increased access to these technologies benefits users and operators alike, interference among different technologies, particularly onboard a single combo device, introduces difficulties during concurrent operation of these technologies. For example, WLAN (in 2.4-2.5 gigahertz (GHz)) and WiMAX (in 2.3-2.4 GHz and 2.5-2.7 GHz) technologies operate in relatively close frequency bands with respect to each other—so close, that an out-of-band emission by one technology may saturate the receiver of the other technology resulting in potential blocking. Thus, the interference between different technologies operating in the same combo device creates coexistence problems.

Coexistence problems in a wireless device may be addressed by multiplexing access to wireless resources (e.g., time and/or frequency used to access the medium) by the various transceivers of a device, where each transceiver is associated with a different network. Resource multiplexing may be implemented by reserving a wireless resource for use by one network for a predetermined time interval. Unfortunately, reserving wireless resources for use by a first network may unnecessarily restrict access to the resource by a second network resulting in an undue reduction in performance of the second network.

Embodiments of the present disclosure provide improved performance in systems using coexisting wireless networks by allowing a wireless device to detect reservation messages transmitted on a wireless network intended to reserve wireless resources for use by a coexisting wireless network. On detection of such a reservation message, the wireless device can use the reserved resources in a way that improves network performance and minimizes interference with the coexisting wireless network.

FIG. 1 shows a wireless system 100 including a wireless device 106 configured for operation on coexisting wireless networks in accordance with various embodiments. The wireless system 100 also includes an access point 112, a wireless device 102, and a wireless device 116. The access point 112 includes a wireless transceiver 114 that is configured to communicate with the wireless device 106 and the wireless device 116 via a first wireless network (wireless network 1). Similarly, the wireless device 106 includes a first transceiver 110 and the wireless device 116 includes a transceiver 118 each configured to provide communication with the access point 112 via the first wireless network. In some embodiments of the system 100, the access point 112, the wireless device 116, and the wireless device 106 are configured to communicate with one another in accordance with a WLAN protocol (e.g., IEEE 802.11b/g/n). In some embodiments, the transceivers 110, 114, 118 are configured for communication according to another wireless standard (e.g., WiMAX).

The wireless device 106 also includes a second transceiver 108 configured for communication via a second wireless network (wireless network 2) using a protocol different from that of the first wireless network. The wireless device 102 includes a transceiver 104 configured to communicate with the wireless device 106 via the second wireless network. The first and second transceivers 110, 108 of the wireless device 106 may interfere with one another if operated concurrently on adjacent or overlapping bands. In some embodiments, the wireless transceivers 104, 108 are configured to communication via a wireless personal area network, such as BLUETOOTH.

The wireless device 106 may multiplex access to wireless resources by the transceivers 110, 108 to mitigate inter-network interference. In some embodiments, operation of the transceivers 110, 108 is time multiplexed, reserving wireless resources for use by a single one of the transceivers 110, 108 for a time interval, thereby preventing interference between the coexisting networks during the interval. In some embodiments of the wireless device 106, the transceiver 110 includes network reservation logic transmits a reservation message onto the first wireless network that notifies the access point 112 and the wireless device 116 that wireless resources are reserved for a time interval specified in the reservation message. On receiving such a reservation message, the access point 112 and the wireless device 116 may forgo access to the first wireless network during the interval specified in the message, reducing the overall performance of the first wireless network.

The transceiver 110 may transmit the reservation message to reserve a wireless resource for use by either of the first or second wireless networks. Embodiments of the transceivers 114, 118 are configured to determine the purpose of a received reservation message, i.e., to determine whether the reservation message reserves resources for use by a coexisting wireless network. If the wireless resources are being reserved to prevent a conflict between the coexisting networks, then the transceivers 114, 118 will use the resources during the reservation interval in a manner that improves the performance of the first wireless network without disrupting operation of the second wireless network for which the resources were reserved.

In some embodiments of the wireless system 100, the wireless device 106 (or the wireless device 116) can serve as an access point (e.g., where the wireless device 106 is configured to operate as a soft access point). In an embodiment where the wireless device 106 is serving as an access point, the wireless devices 112 and 116 operate as stations and may communicate with the access point via wireless network 1. The access point (106) may also communicate with the wireless device 102 via wireless network 2 as described above. If the access point transmits a reservation message that reserves resources on wireless network 1 to prevent a conflict with wireless network 2, the transceivers 114, 118 are configured to determine the purpose of the reservation message and to use the resources to communicate with one another directly (i.e., without involving the access point or using the access point as an intermediary) during the reservation interval.

Figure 2:
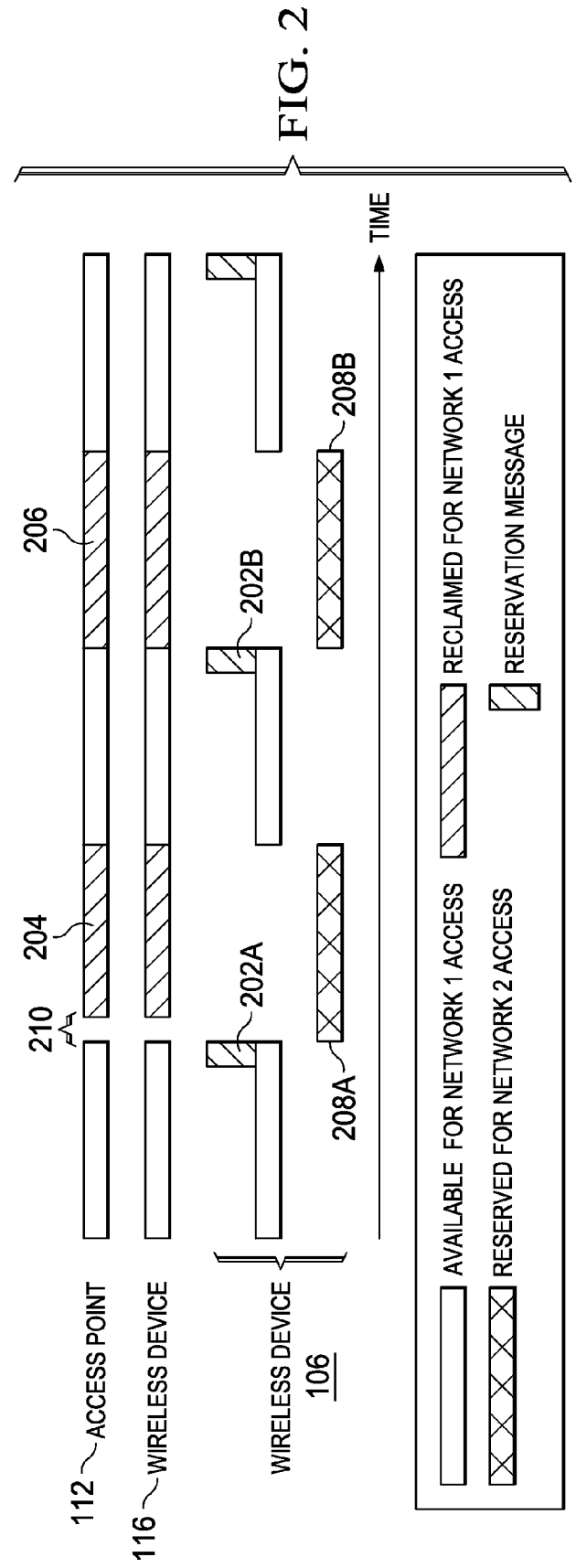
FIG. 2 shows a diagram of activity on a wireless network comprising wireless devices configured to use resources reserved for a coexisting wireless network in accordance with various embodiments.

FIG. 2 shows a diagram of activity on a wireless network comprising wireless devices configured to use resources reserved for a coexisting wireless network in accordance with various embodiments. As explained with regard to FIG. 1, the access point 112, the wireless device 116, and the wireless device 106 are configured to communicate via wireless network 1. The wireless device 106 is also configured to communicate with the wireless device 102 via the coexisting wireless network 2. In order to prevent conflict between wireless networks 1 and 2, the wireless device 106 reserves time period 208 (i.e., 208A and 208B) for use of the transceivers 108, 104 on wireless network 2. The wireless device 106 transmits a reservation message 202 (202A, 202B) on wireless network 1. The reservation message 202 notifies the access point 112 and the wireless device 116 that the time period 208 is reserved, via an interval reservation value included in the message 202. In some embodiments, the reservation message 202 may be a CTS2Self message transmitted by the wireless device 106.

The access point 112 and the wireless device 116 receive the reservation message 202A and determine the purpose of the resource reservation. That is, the wireless devices 112, 116 determine whether the message 202A reserves resources for use by wireless network 1 or by coexisting wireless network 2. The wireless devices 112, 116 monitor activity on wireless network 1 during the time period 208 (e.g., during the interval 210 at the start of the time period 208). If no activity is detected during the interval 210, then the wireless devices 112, 116 may deem the time period 208A to have been reserved for use by the coexisting wireless network 2. Thereafter, the wireless devices 112, 116 may use the remainder of the time period 208A (i.e., the interval 204) for communication via wireless network 1. The wireless devices 112, 116 may communicate with one another or any other device on wireless network 1 during the interval 204 with the exception of the wireless device 106. The wireless devices 112, 116 refrain from communicating with the wireless device 106 during the interval 204 to prevent interference in the transceivers 108 of the wireless device 106 configured to communicate via the coexisting wireless networks 1 and 2.

The access point 112 and the wireless device 116 receive the reservation message 202B and again determine the purpose of the resource reservation. In some embodiments, the purpose of the reservation message may be determined by monitoring the wireless network 1 for activity as described above. In some embodiments, the wireless devices 112, 116 identify a pattern of reservation message 202 transmission, and based on the message 202B conforming to the identified pattern, the wireless devices 112, 116 deem the time period 208B to be reserved for communication via wireless network 2. Accordingly, the wireless devices 112, 116 may use the time period 206 (which may be equivalent to the time period 208A) to communicate via wireless network 1.

In some embodiments of a wireless system, a given wireless device (e.g., the access point 112) may determine that a received reservation message 202 reserves a resource for use by wireless network 2 based on the given wireless device being the only device configured to transmit a reservation message, addressed to the wireless device 106, that reserves the resource for use by the wireless network 1. Consequently, in such a system, the given wireless device can deem the reservation message 202 to reserve a resource for a coexisting wireless network based on message 202 not having been transmitted by the given wireless device. The given wireless device may use the time period reserved by the message 202 to communicate via wireless network 1 with any device other than the device to which the reservation message is addressed.

Figure 3:
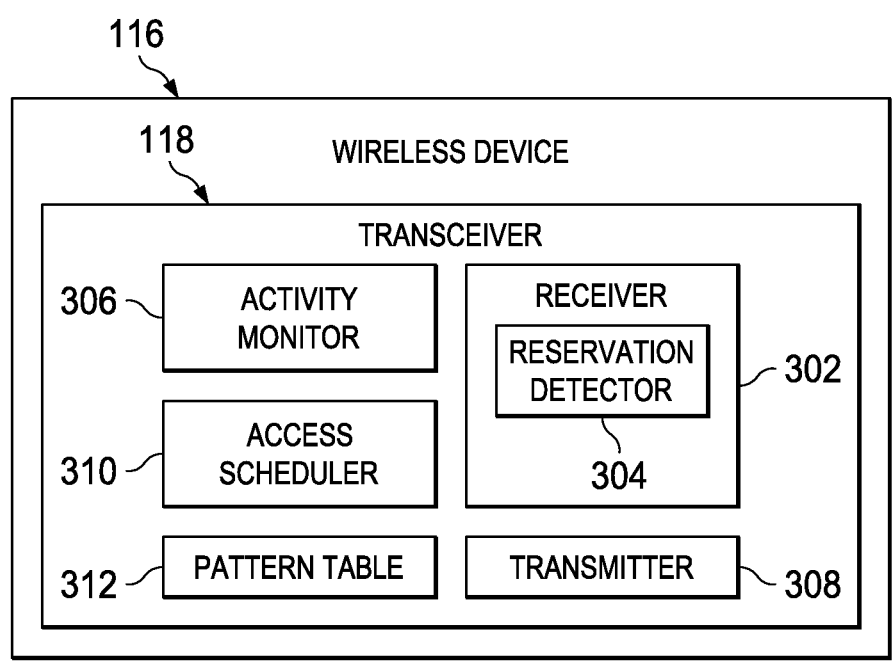
FIG. 3 shows a block diagram of a wireless device including a wireless transceiver configured to detect and use resources reserved for a coexisting wireless network in accordance with various embodiments.

FIG. 3 shows a block diagram of the wireless device 116 including the wireless transceiver 118 configured to detect and use resources reserved for a coexisting wireless network in accordance with various embodiments. The transceiver 118 includes a receiver 302, a transmitter 308, an activity monitor 306, an access scheduler 310, and a pattern table 312. The receiver 302 is configured to receive messages, including the resource reservation message 202, communicated via wireless network 1. The receiver 302 includes a reservation detector 304 that identifies received reservation messages, and determines from the contents of each reservation message, a reservation time interval during which access to wireless network 1 is reserved for use of a wireless device addressed by the message. Some embodiments of the reservation detector 304 are configured to identify a received CTS2Self message as a resource reservation message.

The activity monitor 306 is configured to observe transmissions over wireless network 1 during the reservation time interval. Some embodiments of the activity monitor 306 are configured to observe activity on the wireless network 1 during a predetermined initial portion of the interval (e.g., interval 210), and/or to observe activity by selected wireless devices (e.g., the access point 112 and the device identified by the reservation message). Based on the transmissions observed on wireless network 1 by the activity monitor 306 during the reservation time interval, the access scheduler 310 determines whether the reservation message is intended to reserve access to wireless network 1 to prevent interference or conflict with operation of a coexisting wireless network (e.g., wireless network 2) during the interval. For example, if the wireless device 106 transmits the reservation message 202A to reserve the time period 208A for use by the transceiver 108 on wireless network 2, then no activity will be observed on wireless network 1 during the reservation time interval. Some embodiments of the activity monitor 306, monitor the reserved time interval for transmissions originating at the access point 112 and/or at the wireless device 106 (e.g., the source and/or destination of the reservation message) to determine the purpose of the reservation message.

If the access scheduler 310 determines that a received reservation message is intended to prevent conflict between coexisting wireless networks 1 and 2, then the access scheduler 310 can schedule communications between the wireless device 116 and devices other than the device addressed in the reservation message to occur via wireless network 1 during the reservation interval. For example, the access scheduler 310 may schedule transmission of a message to the access point 112 during the reservation time interval. In this way, the access scheduler 310 improves the overall utilization of wireless network 1, without interfering with the operation of coexisting wireless network 2. The access scheduler 310 can schedule communications with the wireless device addressed in the reservation message (e.g., wireless device 106) to occur after expiration of the reserved time interval.

Some embodiments of the access scheduler 310 are configured to identify a pattern of reservation message transmission. After detection of a pattern of reservation messages intended to prevent conflict between coexisting wireless networks, any received reservation message conforming to the pattern can be identified as a reservation message intended to prevent conflict between coexisting wireless networks, and the reservation time interval specified in the message can be used for communication via wireless network 1. Embodiments of the access scheduler 310 may identify a pattern of reservation message transmission based on the periodicity of the messages. For example, if wireless network 2 is a BLUETOOTH network and the wireless device 106 transmits a voice data packet to the wireless device 102 every 3.75 milliseconds (ms) (e.g., a BLUETOOTH HV3 packet), then the wireless device 106 may transmit a reservation message on wireless network 1 every 3.75 ms. The access scheduler 310 can identify the interval between the periodic reservation messages and deem a reservation message received at the identified interval to be a reservation message intended to prevent conflict between coexisting networks.

The access scheduler 310 may also identify a pattern of reservation message transmission based on the consistency of reservation messages transmitted to or from a wireless device. For example, if a predetermined number of previously received reservation messages addressed to a wireless have been determined to be directed to preventing conflict between coexisting wireless networks, then the access scheduler 310 may deem a next received reservation message to also be a reservation message intended to prevent conflict between coexisting wireless networks.

The pattern table 312 stores information identifying reservation messages sent to/from wireless devices and patterns associated with those messages. For example, information stored in the pattern table may indicate that reservation messages intended to prevent conflict between coexisting wireless networks addressed to the wireless device 106 have been detected at a 3.75 ms period, and the detection time of a last instance of the message. Alternatively, information stored in the pattern table may indicate the last N detected reservation messages addressed to the wireless device 106 were deemed intended to prevent conflict between coexisting networks.

The transceiver 114 of the access point 112 and the transceiver 110 of the wireless device 106 may include components (receiver, transmitter, reservation detector, activity monitor, access scheduler, pattern table) equivalent to those of transceiver 118 and operate as described above. The access scheduler 310 included in the transceiver 114 of the access point 112 be configured differently from that included in the transceiver 118. Consequently, the access scheduler 310 of the access point 112 may employ different and/or additional techniques for identification of reservation messages intended to prevent conflict between coexisting wireless networks. In some embodiments of a wireless system (i.e., infrastructure wireless networks), wireless devices (e.g., wireless devices 106, 118) connect to and communicate via a wireless network (e.g., wireless network 1) through an access point (e.g., access point 112). The access scheduler 310 of the access point 112 may take advantage of this arrangement to simplify identification of relevant reservation messages.

Because communication via an infrastructure based network always involves the access point, the access scheduler 310 of the access point 112 can deem a received reservation message addressed to a wireless device in the network (e.g., device 106, 116) and not transmitted by the access point to be intended to prevent conflict between coexisting networks. Such a determination may be based on the access point detecting no network activity by the addressed device during a portion of the time period reserved by the message. The access scheduler 310 may reuse the time period reserved by the message to improve network efficiency. Accordingly, the activity monitor 306 of the transceiver 114 may monitor only activity of the wireless device addressed by a reservation message based on the message not being transmitted by the access point.

Various components of the transceivers 118, 114 including at least some portions of the reservation detector 304, the activity monitor 306, and the access scheduler 310 can be implemented using a processor and software programming that causes the processor to perform the operations described herein. In particular, a processor executing software programming can identify a reservation message, monitor network activity during a reservation interval, determine whether a reservation message is intended to prevent conflict between coexisting networks, and schedule communications to occur during the reservation interval without conflicting with a coexisting wireless network. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the transceivers 118, 114 using dedicated circuitry (e.g., dedicated circuitry implemented in an integrated circuit). Some embodiments may use a combination of dedicated circuitry and a processor executing suitable software. Selection of a hardware or processor/software implementation of embodiments is a design choice based on a variety of factors, such as cost, time to implement, and the ability to incorporate changed or additional functionality in the future.

Figure 4:
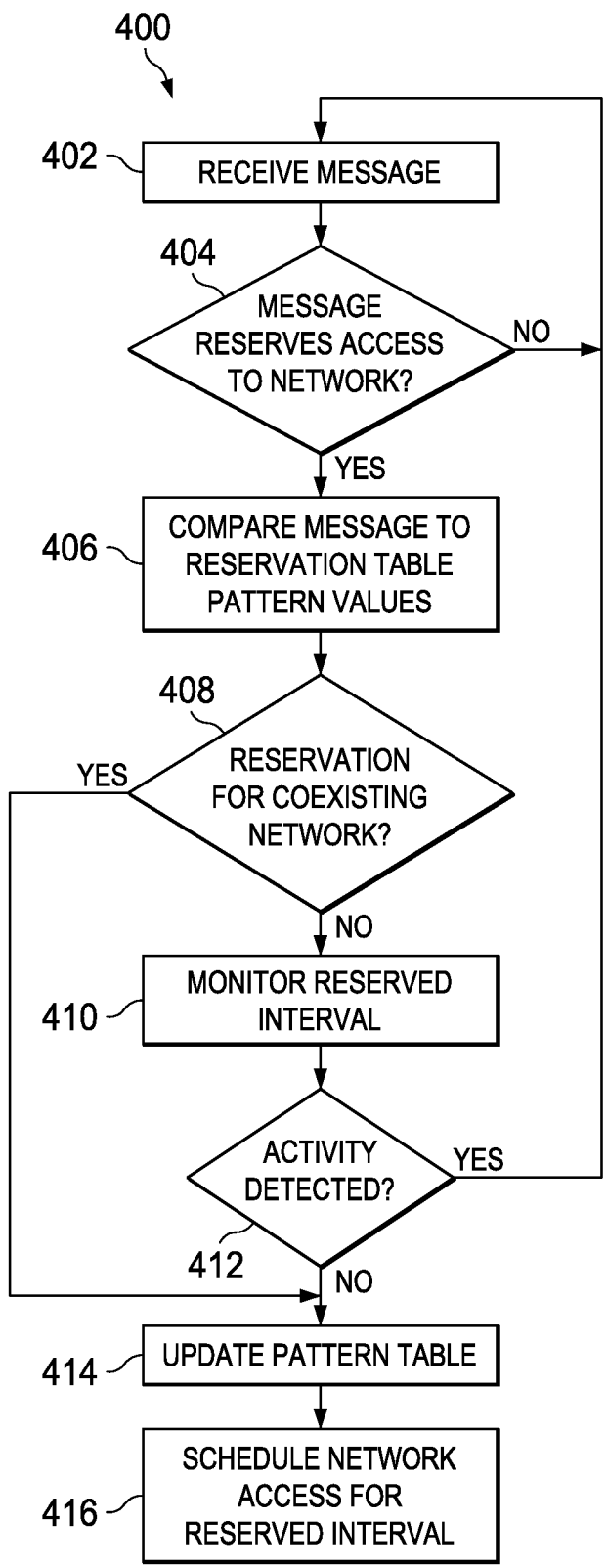
FIG. 4 shows a flow diagram for a method for detecting and using wireless resources reserved for a coexisting wireless network in accordance with various embodiments.

FIG. 4 shows a flow diagram for a method 400 for detecting and using wireless resources reserved for a coexisting wireless network in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 4, as well as other operations described herein, can be implemented as instructions stored in a computer readable medium and executed by a processor.

In block 402, coexisting wireless networks 1 and 2 are operating. The wireless devices 106 and 118 are communicating with the access point 112 via wireless network 1. The wireless devices 102 and 106 are communicating via wireless network 2. In order to prevent interference between the coexisting wireless networks, the wireless device 106 transmits a reservation message via wireless network 1 intended to reserve use of a wireless resource (e.g., medium access) for a time period specified in the message. The wireless device 118 and the access point 112 receive the message. The operations of the method 400 are described below with regard to the wireless device 118, but are also applicable to embodiments of the access point 112.

In block 404, the wireless device 118 determines whether the received message is a resource reservation message that reserves access to a resource of wireless network 1 for a prescribed time period. The determination may be based on a comparison of field values of the received message to stored values indicative of the message being a resource reservation message.

If the received message is determined to be a resource reservation message, then, in block 406, the wireless device 118 compares message information to reservation message pattern values stored in the pattern table 312. The message information may include message timing information, message source and/or destination addresses, reservation time period, etc.

In block 408, based on the comparison, the wireless device 118 determines whether the reservation message is intended to prevent conflict between coexisting wireless networks. For example, the stored reservation pattern values for resource reservation messages addressed to the wireless device to which the received reservation message is addressed may indicate that a reservation message was expected at the time the message was received. The wireless device 118 may therefore determine that the expected message is likely to be a reservation message intended to prevent conflict between coexisting wireless networks based on conformance of the message to the previously identified timing pattern of resource reservation messages for conflict prevention.

If, based on the pattern value comparison, the received message is determined to be intended to prevent conflict between coexisting networks, then, in block 414, the pattern table is updated. Information regarding the received message may be stored in the pattern table (e.g., message reception time, message source and/or destination addresses, reservation time period, conformance to established pattern, etc.) as part of the updating. In block 416, the wireless device 118 schedules communication with devices other than the device 106 via wireless network 1 to occur during the time period reserved by the received reservation message.

If, in block 408, the received reservation message cannot be determined to be intended to prevent conflict between coexisting networks based on the pattern value comparison, then in block 410, the wireless device 116 monitors activity on wireless network 1 during the reserved time period. Some embodiments of the wireless device 116 monitor wireless network 1 for an initial portion of the reserved interval.

In block 410, if the monitoring detects activity (e.g., transmissions) on wireless network 1 during the reserved time period, then the reservation message is deemed not to be intended to prevent conflict between coexisting networks, and the wireless device 116 schedules no communications via wireless network 1 during the reserved time period.

If, in block 410, the monitoring detects no activity on wireless network 1 during the reserved time period, then the reservation message is deemed to be intended to prevent conflict between coexisting networks, and in block 414, the pattern table is updated to include information regarding the newly identified resource reservation message. Information stored in the pattern table for the message may include, for example, message reception time, message source and/or destination addresses, reservation time period, etc.). In block 416, the wireless device 118 schedules communication with devices other than the device 106 via wireless network 1 to occur during the time period reserved by the received reservation message.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless apparatus, comprising:
   a receiver configured to identify a received network reservation message that inhibits access to a first wireless network for an interval defined in the reservation message;
   a network activity monitor configured to monitor wireless activity on the first wireless network during the interval;
   a network access scheduler configured to:
      determine that the reservation message prevents conflict based on the first wireless network being idle for a portion of the interval;
      determine whether the reservation message prevents conflict of the first wireless network with a coexisting wireless network during the portion of the interval; and
      based on a determination that the reservation message prevents conflict of the first wireless network with the coexisting wireless network, schedule the wireless apparatus to transmit on the first wireless network during the interval to a wireless device other than a wireless device identified in the reservation message.

2. The wireless apparatus of claim 1, wherein the network access scheduler is configured to determine that the reservation message prevents conflict based on monitored activity on the first wireless network during the interval.

3. The wireless apparatus of claim 1, wherein the network access scheduler is configured to determine that the reservation message prevents conflict based on a determination that only the wireless apparatus and the wireless device identified in the reservation message are configured to send a reservation message that does not prevent conflict with the coexisting wireless network to the wireless device identified in the reservation message.

4. The wireless apparatus of claim 1, wherein the network access scheduler is configured to schedule the wireless apparatus to transmit to the wireless device identified in the reservation message only after the expiration of the interval.

5. The wireless apparatus of claim 1, wherein the network access scheduler is configured to identify a pattern of previous reservation message transmission indicating that the reservation message prevents conflict of the first wireless network with the coexisting wireless network.

6. The wireless apparatus of claim 1, wherein the network access scheduler is configured to identify the reservation message as a reservation message that prevents conflict of the first wireless network with the coexisting wireless network based on an identified timing pattern of previously received reservation messages that prevent conflict of the first wireless network with the coexisting wireless network.

7. The wireless apparatus of claim 1, wherein the network access scheduler is configured to identify the reservation message as a reservation message that prevents conflict of the first wireless network with the coexisting wireless network based on a predetermined number of previously received reservation messages that prevent conflict of the first wireless network with the coexisting wireless network identifying the wireless device identified in the reservation message.

8. The wireless apparatus of claim 1, wherein the network access scheduler comprises a table storing reservation message status; and the network access scheduler is configured to store in the table status values for each wireless device identified in a reservation message, the values indicating whether a received reservation message prevents conflict of the first wireless network with the coexisting wireless network.

9. A method, comprising:
   receiving, by a first wireless device, a network reservation message that reserves access to a resource of a first wireless network for an interval defined in the reservation message;
   monitoring, by the first wireless device, wireless activity on the first wireless network during the interval;
   determining, by the first wireless device, whether the reservation message prevents conflict of a coexisting wireless network with the first wireless network in a second wireless device based on the first wireless network being idle for a portion of the interval; and
   scheduling, by the first wireless device, a transmission to a third wireless device on the first wireless network to occur during the interval.

10. The method of claim 9, wherein the determining that the reservation prevents conflict is based on monitored activity on the first wireless network during the interval.

11. The method of claim 9, wherein the determining that the reservation prevents conflict is based on the first wireless device determining that only the first wireless device and the second wireless device are configured to send a reservation message that does not prevent conflict with the coexisting wireless network to the second wireless device.

12. The method of claim 9, wherein the scheduling comprises scheduling a transmission to the second wireless device only after the expiration of the interval.

13. The method of claim 9, further comprising identifying a pattern of previous reservation message transmission indicating that the received reservation message prevents conflict of the wireless network with the coexisting wireless network.

14. The method of claim 9, further comprising identifying the received reservation message as a reservation message that prevents conflict of the first wireless network with the coexisting wireless network based on an identified timing pattern of previously received reservation messages that prevent conflict of the first wireless network with the coexisting wireless network.

15. The method of claim 9, further comprising identifying the received reservation message as a reservation message that prevents conflict of the first wireless network with the coexisting wireless network based on a predetermined number of previously received reservation messages that prevent conflict of the first wireless network with the coexisting wireless network being addressed to the second wireless device.

16. The method of claim 9, further comprising storing in a reservation status table a value corresponding to each wireless device to which a reservation message is addressed indicating whether the reservation message prevents conflict of the wireless network with the coexisting wireless network.

17. The method of claim 16, further comprising identifying the received reservation message as a reservation message that prevents conflict of the first wireless network with the coexisting wireless network based on a value stored in the table for the wireless device to which the reservation message is addressed.

18. A system, comprising:
  a first wireless device comprising:
    a first transceiver configured to access a first wireless network;
    a second transceiver configured to access a coexisting wireless network; and
    network resource reservation logic configured to transmit a first reservation message identifying the first wireless device via the first transceiver, wherein the first reservation message inhibits access to the first wireless network for a time interval defined in the reservation message;
  a second wireless device comprising:
    a third network transceiver configured to access the first wireless network;
    a network activity monitor configured to monitor wireless activity on the first wireless network; and
    a scheduler configured to:
      determine whether a received reservation message identifying the first wireless device corresponds to the first reservation message based on inactivity of the first wireless network during the time interval detected by the network activity monitor; and
      schedule, based on a determination that the received reservation message corresponds to the first reservation message, the third network transceiver to communicate with wireless devices other than the first wireless device via the first wireless network during the time interval.

19. The system of claim 18, wherein the second wireless device comprises:
  reservation status storage that stores values indicating whether previously received reservation messages correspond to the first reservation message;
  wherein the scheduler is configured to determine whether a received reservation message corresponds to the first reservation message based on a value corresponding to the first wireless device stored in the reservation status storage.

20. The system of claim 18, wherein scheduler is configured to determine that the reservation message corresponds to the first reservation message based on a determination that only the second wireless device and the first wireless device are configured to send to the first wireless device a reservation message that does not prevent conflict with the coexisting wireless network.

21. The system of claim 18, wherein the scheduler is configured to identify a pattern of first reservation message transmission by the first wireless device; wherein the pattern comprises one of a timing pattern of first reservation message transmission and a predetermined percentage of previously received reservation messages identified as corresponding to the first reservation message.

* * * * *